UNITED STATES PATENT OFFICE.

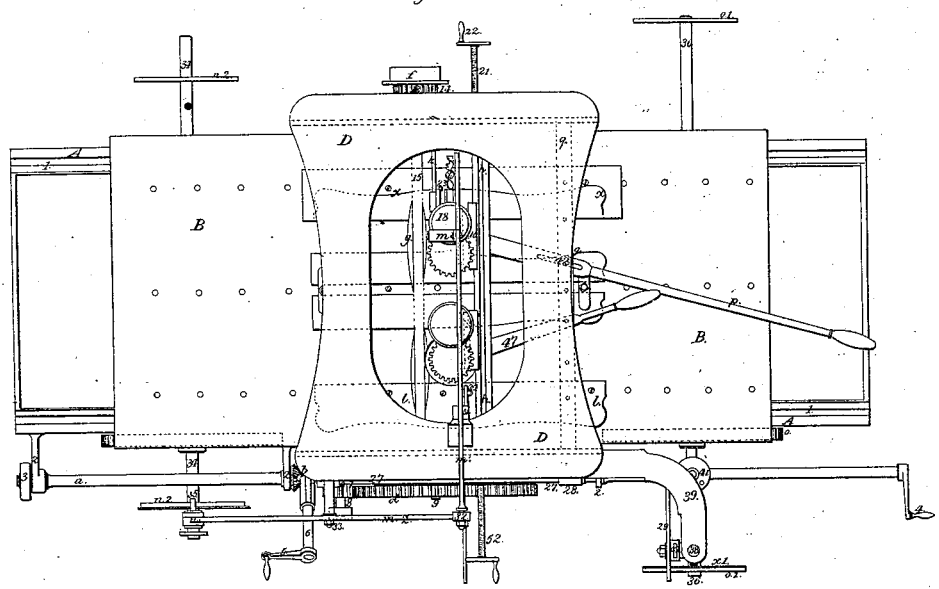

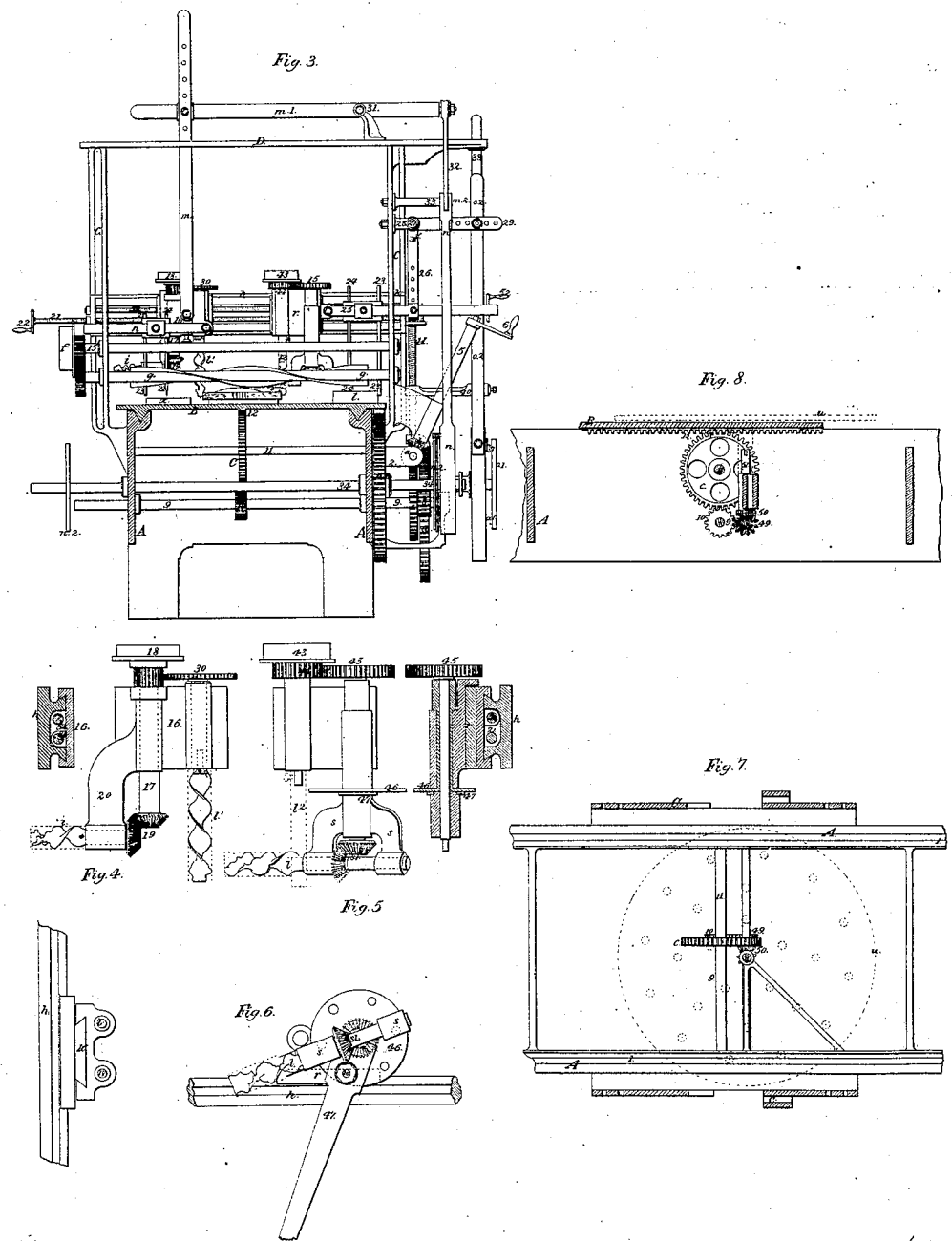

ELIAS A. SWAN, OF BROOKLYN, NEW YORK, AND DE WITT C. SMILEY, OF NEW YORK, N. Y.

MACHINERY FOR DRESSING AND CARVING STONE.

Specification of Letters Patent No. 13,343, dated July 24, 1855.

*To all whom it may concern:*

Be it known that we, ELIAS A. SWAN, of Brooklyn, in the county of Kings, and DE WITT C. SMILEY, of the city of New York, in the State of New York, have invented, made, and applied to use certain new and useful Improvements in Machinery for Cutting and Dressing Stone and Similar Material; and we do hereby declare that the following is a full, clear, and exact description of the construction and operation of the same, reference being had to the annexed drawing, making part of this specification, wherein—

Figure 1, is a plan of the machine complete, Fig. 2, is a side elevation and Fig. 3, is an end elevation of the same, the other figures are hereafter referred to, and similar marks of reference designate the same parts in all the figures.

The rigid and unyielding nature of marble or similar materials, renders it extremely difficult to carve or otherwise cut said material with a rotating cutter of any description, because the metal in the machine used for such purposes springs under the operation of the cutter, which springs back again as the cutter clears the stone, and as the cutter comes around again to take the stone it is with a blow and consequent vibration which quickly destroys the cutter and also the machine, and at the same time makes the work in ridges and jogs that destroy its beauty and finish, and the stone is very apt to be cracked or broken.

The object of our invention is to obviate these difficulties by twisting the rotating cutter in an auger shape, so that however the same may be applied to the stone, the cut is a shearing cut instead of a square blow, and in most cases the twist causes one part of the cutter to take the stone before the previous part leaves it, consequently the cutters become more of boring tools; and one part of the cutter always remaining in contact with the stone prevents vibration consequent upon the blow of the cutter, and makes the work perfect and renders the machine durable and efficient.

In the annexed drawings we have represented various modes in which this method of cutting by a twisted or spiral cutter can be applied advantageously to different kinds of carving or cutting on stone, although we do not limit this twisted cutter merely to use in said modes, but intend to apply the same under whatever circumstances it may be available for cutting stone or similar rigid substances.

A is a frame of suitable construction provided with V slides 1, 1, which receive the main sliding bed B.

C, C, are the vertical sides provided with slides to receive the parts; and D, is the head block connecting the same.

$a$, is a horizontal shaft set in journals 2, 2, and provided with a pulley 3, at one end by which it can be rotated by power if required, or by a handle 4, when turned by hand, and to give the operator facility for moving the parts when standing near the center of the machine, miter pinions $b$, are provided, one on the shaft $a$, and the other on a shaft 5, that is fitted with a handle 6, by which the said shaft $a$, may be rotated. The motion of the shaft $a$ is communicated through a worm pinion 7 to a wheel $c$, and thence through a pinion 8, to a wheel $d$, on the shaft 9, that runs across the machine and is provided with a pinion 10, see Fig. 7, near the center of the machine, gearing into a wheel $e$, on a shaft 11, which taking a rack 12, on the under side of the bed B, slides the same endwise in either direction according as the shaft $a$, is rotated one way or the other.

On the slides C, suitable adjustable boxes are provided, receiving a cross shaft 15, with a pulley $f$ on one end and also a pinion 13, gearing to a wheel 14, below on the shaft of a twisted cutter $g$ that extends across over the bed B. This twisted cutter is to be formed of one or more steel sections to which the required twisting form is given, and these sections are to be inserted into a slotted shaft or otherwise suitably attached so that when revolved the cutters shall describe a cylinder or parts of a cylinder, and the twisted form or arrangement of the cutter should be such that one end of the succeeding cutter shall take the stone before the end of the preceding cutter has left the surface, thereby there is no blow or vibration in the machine, and the cutting is a gradual shearing operation; and in cases where the extreme narrowness of the stone prevents the next cutter reaching the stone before the preceding one has left, still the cutter only strikes at one point, and does not produce that blow which a straight cutter would against the rigid stone.

In order to apply this twisted cutter to forming moldings and to vertical as well as horizontal cutting we provide a cross slide $h$, which may be adjusted vertically by means of side screws if required the same as a machine for planing metal. 16 is a double slide rest on the said cross slide $h$, (see Fig. 4) fitted so as to slide vertically or crosswise along on the slide $h$, and said slide rest carries a vertical shaft 17 with a pulley 18, on its upper end receiving the required rotation by a belt to any competent power, and on the lower end of the shaft 17, is a miter gear 19, to a similar gear on the shaft of a horizontal twisted cutter $i$, formed of a twisted plate or sections attached to its shaft by screws or other suitable means, and the shaft of this cutter passes through a journal on the lower end of an arm 20, from the slide rest 16.

It will now be evident that by raising or lowering the main cross slide $h$, or the vertical slide of the slide rest 16, the horizontal twisted cutter $i$ can be made to cut a plane surface or mold of any desired form on different thickness of material, and by means of a screw 21, and handle 22, or a lever $p$, moving on a fulcrum 42 the slide rest 16, may be slid crosswise of the machine, which acting at the same time that the bed B is moved will produce a curved molding corresponding with the mold formed in the cutter; and where a curved, waving or undulating surface is to be cut, the same may be effected by raising or lowering the slide rest 16, as the work progresses. One method of accomplishing this object is shown in the drawing, in which a vertical link $m$, is jointed to the slide rest 16, so that it can be slid vertically and said link $m$, connects by clamps slots or holes to a lever $m^1$, on a fulcrum 31, the outer end of which is jointed by a link 32, to a horizontal lever $m^2$, on a fulcrum 33, from the end of which a vertical link $n$, descends and by a slotted end passes on both sides of a cross shaft 34, receiving motion from the bed B, by means of a gear wheel $n^1$, taking rack teeth on the under side of the edge of said bed B.

$n^2$ is a wheel or disk to which any suitable pattern may be secured, which turning under a point or roller 35, acts through the lever and raises or depresses the cutter $i$ as required.

30 is a gear wheel receiving motion from a pinion beneath the pulley 18, and rotating a vertical cutter $l^1$ attached so that it can be removed from the shaft carrying it and not be in the way when the cutter $i$ is in operation.

From the foregoing description it will be understood that by the combined operation of the screw 21, the motion of the bed B, (caused by the turning of the handle 6, or otherwise) and the raising and lowering the cross slide $h$, or slide rest 16, the cutters $i$ or $l^1$, can be moved to or placed in any desired position; we therefore are able to cut out almost all descriptions of carved work, and by making the twisted cutters movable from their stock or shaft the cutters can be varied to suit the mold or character of carving. And in order to cut out table tops, mantels or similar slabs, we are enabled to do so to a drawing ($x$) attached to and traveling with the bed. For this purpose a horizontal bar $k$, is attached to the slide rest 16 and provided with an adjustable slide carrying a pointer 24, which pointer the workman, by the combined action of the screws before specified, keeps over the drawing (at $x$) as the same moves with the bed B, and material operated on. Thus a ready and quick means is provided by which the machine can be worked by hand as desired. And in order to make the machine partially self operating, so as to cut out the sides of mantels or similar parts, we make use of a vertical guide 23, which may be kept against the side of a pattern $l$, (see attachment to similar slide rest $r$,) by a weighted lever or any similar means.

In cases where the position of the bed B, or character of material operated on, renders it expedient to use the handle 4, or to have two men to attend the machine, a drawing at $x^1$ may be attached to a disk $o^1$, that is set on the end of a cross shaft 36, and receives motion from the bed B, by the rack or its edge acting on a wheel $o$, and 37 is a pointer or a vertical rod 38, that is guided by a fork at its lower end over the shaft 36, and at the upper end by a bracket 39.

The rod 38 is raised or lowered so as to cause the pointer 37 to follow the drawing as it rotates with the disk $o^1$, by means of a screw 41 passing through an arm 40, from the rod 38, setting into a socket on a sleeve around the shaft 36, which screw 41 is provided with a crank or hand wheel so as to be rotated, and this motion, regulated to a drawing is communicated to a slide rest $r$, on the cross slide $h$, so as to determine the position of the vertical rotating cutter 29, of a horizontal shaft 27, set in bearings 28, on the frame C, and provided with an arm 25 connecting to said slide rest by a bar 25. And this slide $r$ may also be provided with a clamp to connect the second cross screw 52, so that said slide rest may be moved crosswise of the machine when the workman stands near the center of the machine, in which case the connection to the arm 26, should be removed; and this slide rest may also be provided with a tracing point 24, and guide arm 23 to work to a pattern or drawing traveling with the bed B, and by this arrangement two mantels or the opposite sides of a table top can be cut every time the bed B, slides to the end; and as the cutters should be set to operate on opposite sides, the lateral strain on the machine is relieved. And by fitting levers and rods on both sides, similar to those connected to the disks $n^2$ and $o^1$, the machine would be adapted to working double, so that one or more pieces of marble might be under operation while others were being attached to the bed, and for this purpose the bed is to be provided with the necessary grooves and holes to secure said material.

In carving out arches, circles or ellipses for mantles, jointing the corners of beads that come together at an angle by a segment of a circle, and in various other kinds of curved work, it is highly important that the axis of the horizontal cutter should be parallel to and over the radial line from which said curves are described or else in its rotation a perfect mold or cut could not be produced in consequence of the change of direction of the cut. For this purpose we have therefore provided an attachment to the slide rest $r$, (see also Figs. 5, and 6, which are an elevation and plan from below of the same). On the slide rest, the vertical shaft of the pulley 43, which is driven by a belt, is fitted with a pinion 44 which gears to and rotates a wheel 45, on the upper end of a vertical shaft that is set in bearings on the slide rest $r$, and carries near its lower end a disk 46, and strong sleeve, in which the shaft rotates freely, and 47 is a lever the inner end of which sets around the sleeve, under the disk 46, and a pin 48, passing through holes in both the disk and lever gives the facility for turning the disk 46, completely around by successively shifting the pin or bolt 48, into another hole in the disk.

On the sleeve attached to the disk 46, that sets around the vertical shaft, a yoke S, is attached and provided with journals carrying the shaft of a horizontal cutter $t$, and $s^1$, are miter gears communicating motion from the shaft of the wheel 45, to the horizontal cutter $t$, which cutter is to be twisted and formed with the desired mold; and it will now be seen that by means of the lever 47 the said cutter can be turned around so as always to stand on the radial line of any curved figure that said cutter may be forming. And in cases where the cutter $t$, is required to be inclined out of a horizontal plane, the same may be done by forming the yoke $s$, double and providing holes by which it may be bolted with the cutter $t$, at any required angle, to the sleeve or disk 46; and in this case the bevel gears $s^1$, will have to be formed with rounding teeth to prevent their joining.

In carving stone it is very often more expedient to use a circular rotating bed carrying the material to be operated on, for where such a bed in used beneath the slide $h$, the mere turning of the screws 21 or 52 as the circular bed revolves will cut all around a square, circle, oval, or similar shape for table tops or other articles; to give this facility we provide a pinion 49, on a cross shaft (see Figs. 7 and 8,) which receives motion from the pinion 10, before referred to, and by means of miter gears 50, rotates a vertical shaft 51, set in suitable bearings, the upper end of which is provided with a square or key seat receiving the socket of a circular bed $u$, shown by dotted lines in Figs. 7 and 8.

It will be evident that another cross slide might be used facing the slide $h$, on the other part of the vertical frame C, so as to make the slide $h$ firmer by a connection therewith or said second cross slide may carry a second set of slide rests and cutters to operate as the bed comes back, thereby avoiding loss of time in running back the bed.

We are well aware that spiral cutters have been used for shearing cloth and similar purposes, and also that cutters of planing machines have been fitted spirally or on an incline, and also that picks for stone dressing machines have been arranged around a cylinder in rows that are not parallel to the shaft but inclined thereto. Therefore we make no claim to any of these devices; but we are not aware that cutting tools for dressing stone have ever before been formed as a gradual and constant twist or incline, so that no point of the cutting edge is parallel to the axis of motion of said cutter, thereby the cut on stone or similar rigid substances is a shearing cut at all times, and no blow is given by said cutter on the stone, and all vibration of the machine is consequently prevented, and the cut partakes more of the character of a continuous boring operation that both preserves the cutters and machine, at the same time that the best character of work is cut, and that on very thin stone that would be broken to pieces if the cutter acted with any blow. And we are also aware that the cutting tools of various characters of machines have been directed in their motion by patterns and screws but we are not aware that a drawing moved with the bed, and so fitted that the cutting tool is regulated by keeping a tracing point over said drawing, has ever before been used, whereby the most delicate work can be cut to a drawing without the expense of a pattern; the motion given to said cutter being from the combined operation of the cross slide rest, acting with the main bed to produce any desired shape of cut according to the drawing the machine is made to follow.

What we desire to secure by Letters Patent is—

1. We claim the method herein described and shown of, dressing carving or cutting stone or similar rigid and unyielding substances by the use of a rotating cutter whose cutting edge is spiral or at an incline with the axis of said rotating cutter, thereby the cutting edge always operates obliquely on the material under treatment and effectually prevents any blow on the stone that would produce a vibration of the machine, or break the cutter or stone, for the purposes and as specified.

2. We claim the method herein described of fitting a horizontal or inclined rotating cutter so that it can be kept radially with any curved mold or cut it may be forming, viz. by the use of the yoke $s$, and parts attached substantially as specified.

In witness whereof we have hereunto set our signatures this fourth day of June 1855.

ELIAS A. SWAN.
DE WITT C. SMILEY.

Witnesses:
   Geo. W. Reid,
   Lemuel W. Serrell.